United States Patent [19]
Hursey

[11] Patent Number: 6,138,546
[45] Date of Patent: Oct. 31, 2000

[54] HAND-OPERATED CUTTER FOR A SHEET-LIKE WORKPIECE AND A METHOD OF CUTTING

[75] Inventor: William A. Hursey, Picayune, Miss.

[73] Assignee: John Knoell & Sons, Inc., New Britain, Pa.

[21] Appl. No.: 09/231,880

[22] Filed: Jan. 14, 1999

[51] Int. Cl.[7] .................. B26D 1/11; B26D 3/02; B26D 3/06; B26D 7/02

[52] U.S. Cl. ................ 83/875; 83/862; 83/455; 83/481; 83/581; 83/614; 83/620; 83/564; 83/578; 83/698.71; 83/954

[58] Field of Search ............. 83/875, 877, 861, 83/863, 454, 455, 481, 581, 614, 620, 698.11, 821, 829, 698.41, 698.71, 699.11, 699.21, 954, 563, 564, 862, 468, 578, 485, 581.1

[56] References Cited

U.S. PATENT DOCUMENTS

| | | | |
|---|---|---|---|
| 513,851 | 1/1894 | Wheeler | 83/452 |
| 3,897,706 | 8/1975 | Martin | 83/455 |
| 4,036,486 | 7/1977 | Molpus | 269/303 |
| 4,590,834 | 5/1986 | Sobel | 83/455 |
| 4,798,112 | 1/1989 | Kozyrski et al. . | |
| 4,798,118 | 1/1989 | Carithers, Jr. | 83/875 |
| 4,858,507 | 8/1989 | Evans et al. | 83/455 |
| 4,867,023 | 9/1989 | Kozyrski et al. . | |
| 4,871,156 | 10/1989 | Kozyrski et al. . | |
| 4,941,380 | 7/1990 | Lockwood . | |
| 5,161,445 | 11/1992 | Kozyrski et al. | 83/455 |
| 5,269,212 | 12/1993 | Peters et al. | 83/455 |
| 5,603,253 | 2/1997 | Logan . | |

*Primary Examiner*—Rinaldi I. Rada
*Assistant Examiner*—Boyer Ashley
*Attorney, Agent, or Firm*—Howson and Howson

[57] ABSTRACT

A hand operated cutting apparatus and method of cutting mat board, glass, and other related sheet-like framing material. The apparatus has a cutting head assembly which includes a plurality of interchangeable and adjustable blade holding units. Each blade holding unit provides a different type of cut, such as a beveled, straight edge, or V-groove cut. Most of the blade holding units are intended for use with mat board, but some can be used to cut and trim sheet-like glass or plastic framing material. Each blade holding unit is also capable of vertical adjustment relative to the workpiece so that various depths of cut can be provided. The method of cutting a mat board permits the mat board to be positioned face up on the base board of the cutting apparatus and does not require flipping or taping of the mat board during V-groove cutting operations.

12 Claims, 6 Drawing Sheets

FIG. 7
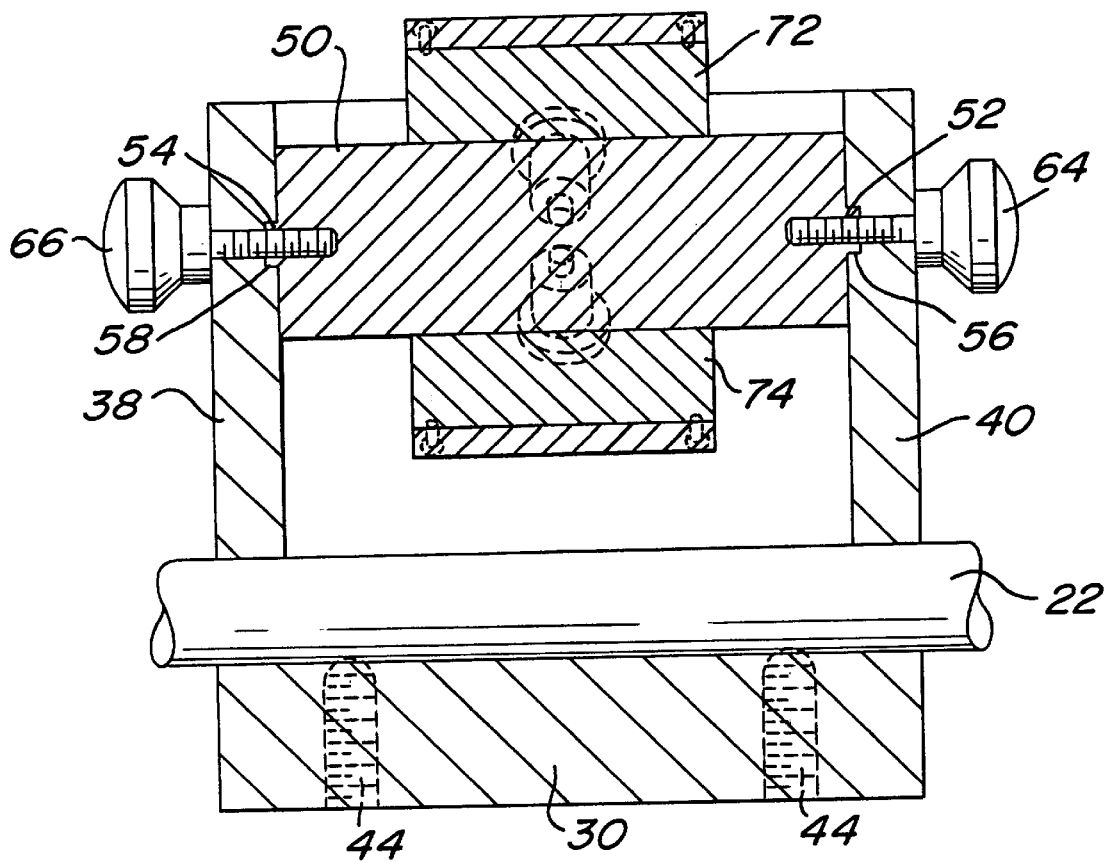
FIG. 8
FIG. 9
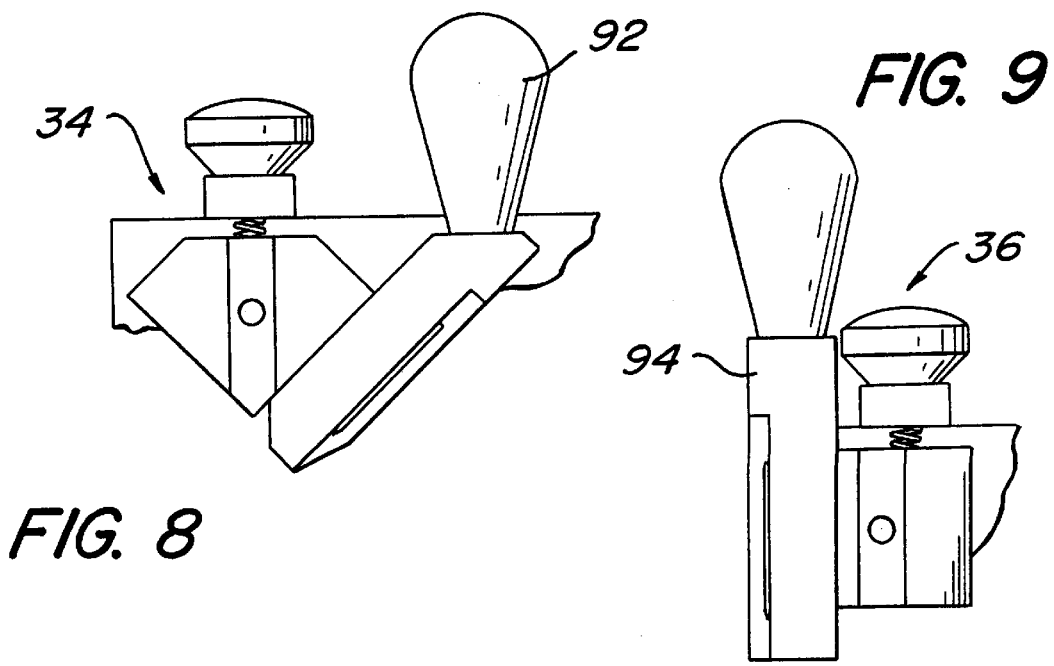

HAND-OPERATED CUTTER FOR A SHEET-LIKE WORKPIECE AND A METHOD OF CUTTING

FIELD OF THE INVENTION

The present invention relates to a hand-operated apparatus and method for cutting a sheet-like workpiece, such as mat board, and more particularly, the present invention relates to a cutting apparatus having a cutting head assembly with a plurality of interchangeable and adjustable blade holding units such that the type of cut and the depth of the cut are readily selectable among a range of alternatives.

BACKGROUND OF THE INVENTION

Various hand-operated cutting apparatus for cutting mat board used in picture framing are known in the art. Typically, such apparatus are used to cut apertures in the mat board utilizing a beveled edge cut. To this end, the mat board is positioned face down on a base board of the cutter and is held in that position by a clamping bar. The clamping bar is typically connected to a handle which is pivotally connected to the base board to permit opening and closing of the clamping bar relative to the base board. The clamping bar has a shaft on which a cutting head is connected and travels. Generally, the cutting head is permanently attached to the shaft and does not include interchangeable parts, with the exception of the blade, and does not permit ready adjustment relative to the type of cut or to the depth of the cut.

Examples of known hand-operated mat bevel cutting apparatus are provided by U.S. Pat. No. 4,941,380 issued to Lockwood and U.S. Pat. Nos. 4,798,112, 4,867,023 and 4,871,156 issued to Kozyrski et al. Each includes a base board, a clamping bar, and a traveling cutting head.

Various other types of cuts are utilized by picture framers, designers, artists, photographers and the like. For example, decorative V-grooves are commonly cut into mat board; non-beveled or straight edge cuts are commonly used for trimming or other purposes on various types of sheet-like workpieces; and plates of glass or plastic used in frames require cutting and trimming. Typically, each type of cut requires use of a separate cutting apparatus. For instance, an example of a V-groove cutting apparatus is provided by U.S. Pat. No. 5,603,253 issued to Logan.

Cutting apparatus which can accomplish multiple types of cuts generally require overly complicated procedures for performing the cutting operations. For example, bevel cutters can be utilized to produce V-grooves in mat board. This is accomplished by facing the mat board face down and making a beveled cut completely through the mat board to create two separate mat board pieces, one surrounding the other. The center piece of mat board is positioned, by itself, face up on the cutter and its edges are trimmed so that its edges are provided with a reversed bevel. Thereafter, the center piece is then re-positioned face down within the surrounding piece of mat board and the two separate pieces are taped together with adhesive tape. Thus, when the front face of the mat board is viewed, it appears to have a V-groove cut therein.

While various ones of the mat board bevel cutters and V-groove cutters disclosed in the above referenced patents may function satisfactorily under certain circumstances, there is a need for a single cutting apparatus which is capable of making a variety of different types of cuts in a variety of different types of sheet-like workpieces. The cutting apparatus should have a cutting head assembly with interchangeable parts so that various types of cuts and depths of cuts can be accomplished. Each cut should not require overly complicated steps to accomplish; for example, V-groove cuts should not require complete severing, flipping, or taping of the mat board. The cutting apparatus should be capable of cutting mat board, cardboard, glass, plastic and like sheet-like materials commonly used in the picture framing industry. In addition, the cutting apparatus should be easy to use and capable of inexpensive manufacture.

OBJECTS OF THE INVENTION

With the foregoing in mind, a primary object of the present invention is to provide a multi-purpose, hand-operated cutting apparatus that has interchangeable and adjustable features which permit cutting of various types and thicknesses of sheet-like workpieces in a range of manners and depths.

Another object of the present invention is to provide a hand-operated mat board cutter which can readily accomplish beveled, straight edge and V-groove cuts in an efficient manner such that the mat board is always only required to be positioned on the apparatus with the front face of the mat board facing up.

A further object of the present invention is to provide a hand-operated cutting apparatus that has a cutting head assembly with readily interchangeable parts enabling a quick changeover to any of a variety of different blade holding units, each of which is capable of providing a depth of cut which is readily adjustable.

A still further object of the present invention is to provide a hand-operated cutting apparatus which is also capable of cutting glass, plastic or like framing material.

SUMMARY OF THE INVENTION

More specifically, the present invention provides a hand-operated apparatus for cutting a sheet-like workpiece, such as mat board. The apparatus has a base board for supporting the workpiece, a clamping bar assembly extending across and pivotally mounted to the base board for clamping the workpiece to the base board, and a cutting head assembly mounted on the clamping bar assembly for lengthwise slidable movement thereon. The improvement relates to the cutting head assembly which comprises a body section and a plurality of interchangeable blade holding units.

The integral body section of the cutting head assembly engages the clamping bar assembly and has a pair of spaced-apart, outwardly extending arms. Each interchangeable blade holding unit carries at least one blade, and is capable of being removably mounted, one at a time, to and between the arms of the body section. Each blade holding unit is connected to the arms in a manner which permits ready adjustment of the resulting depth of cut by the blade relative to the workpiece.

According to another aspect of the present invention, a method is provided for cutting a sheet-like workpiece utilizing the above referenced hand operated cutting apparatus. To this end, a sheet of mat board is located on the base board of the cutting apparatus such that the rear face of the mat board confronts the base board and the front face of the mat board faces upwardly from the base board. With the mat board in position, the blade carrier is pivoted 45° from its normal, centered, non-cutting position, and the cutting head assembly is slid lengthwise on the clamping bar assembly. Additional steps can include: selecting one of the plurality of blade holding units to make a cut, mounting the selected blade holding unit to the arms of the cutting head assembly, positioning the blade holding unit such that a selected depth of cut is provided, and locking the blade holding unit to the cutting head assembly with depth locking fasteners.

BRIEF DESCRIPTION OF THE DRAWINGS

The foregoing and other objects, features and advantages of the present invention should become apparent from the following description when taken in conjunction with the accompanying drawings, in which:

FIG. 7 is a cross-sectional view of the cutting head assembly of FIG. 3 taken along line 7—7;

FIG. 8 is a side elevational view of an alternate blade holding unit according to the present invention;

FIG. 9 is a side elevational view of a second alternate blade holding unit according to the present invention;

DETAILED DESCRIPTION OF THE PREFERRED EMBODIMENT

Figure 1:
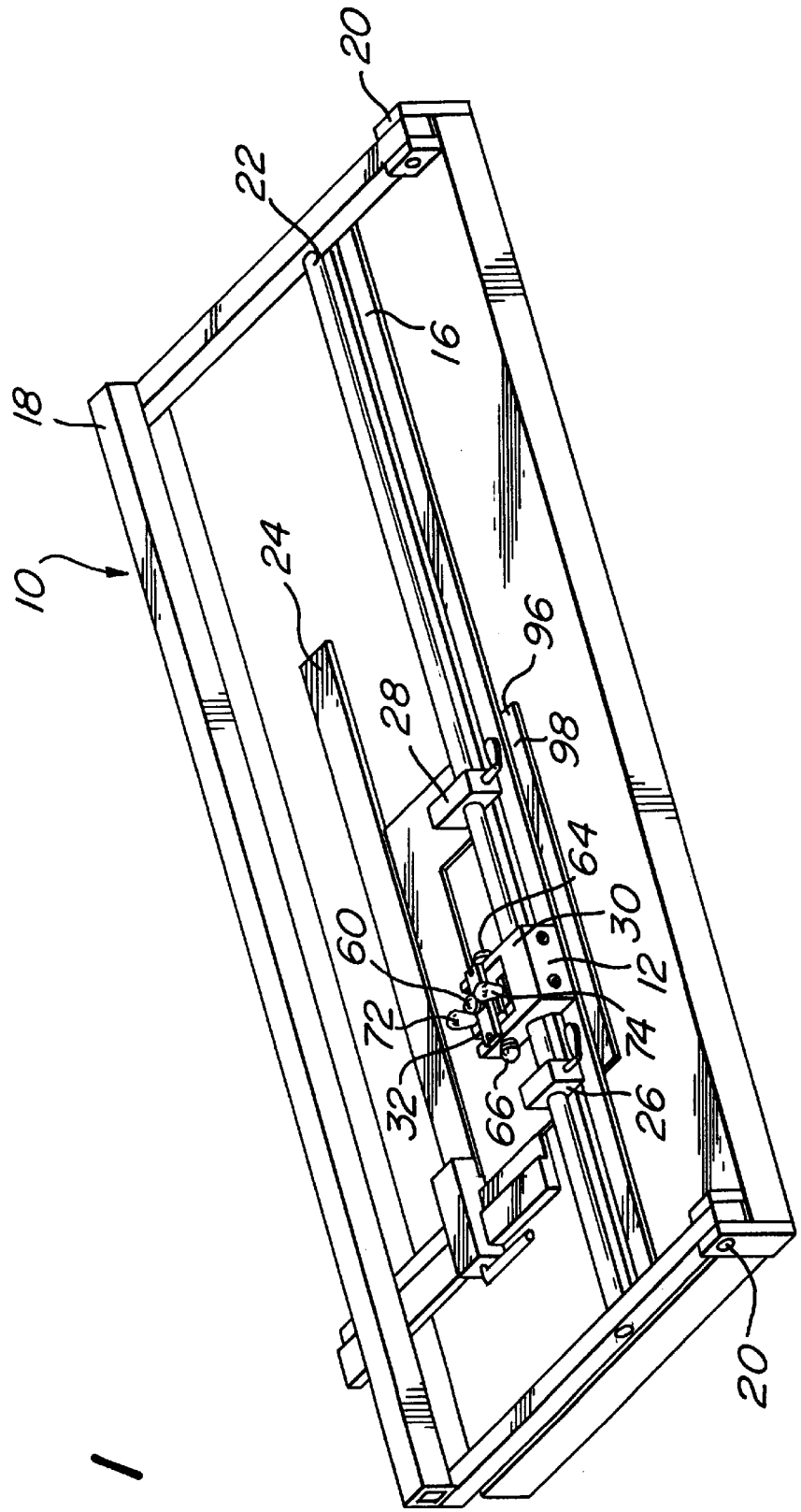
FIG. 1 is a perspective view of a hand-operated cutting apparatus embodying the present invention.

Referring now to the drawings, FIG. 1 illustrates a hand operated cutting apparatus 10 for cutting sheet-like framing material. As will be discussed, the novel aspect of the apparatus 10 lies in the structure and operation of its cutting head assembly 12. However, the apparatus 10 also has many components which are common to many known hand-operated cutting apparatus. These known components will be briefly discussed first.

The cutting apparatus 10 includes a base board 14 on which a sheet-like workpiece to be cut is supported. A clamping bar assembly 16 is located on a handle assembly 18 which is connected by a hinge 20 to the base board so that the handle assembly 18 is pivotal between open and closed positions. Thus, the clamping assembly 16 can be closed on a workpiece to clamp the workpiece to the base board 14.

The clamping assembly 16 includes a shaft 22 on which the cutting head assembly 12 is connected. The shaft 22 provides a guide for movement of the cutting head assembly 12 lengthwise along the shaft 22. The cutting head assembly 12 has at least one blade, such as a razor blade, which can positioned into a cutting position and which, when the cutting head assembly 12 is caused to travel along a portion of the shaft 22, cuts the workpiece.

The precise location of the cut in the workpiece is controlled by a squaring guide 24 adjustably mounted on the base board 14 and a pair of cutting head assembly stops, 26 and 28, which limit the movement of the cutting head assembly 12 between fixed positions on the shaft 22. The squaring guide 24 and stops, 26 and 28, can be set as desired to provide the intended location and length of cut in the workpiece.

Turning now to the novel aspects of the present invention, the cutting head assembly 12 is provided by a solid body section 30 and a plurality of interchangeable blade holding units, 32, 34 and 36. The interchangeability of the blade holding units permits different types of cuts to be accomplished, for example, beveled, straight edge or V-groove cuts. See FIGS. 10–12 which illustrate these cuts in a piece of mat board. In addition, the blade holding units permit vertical adjustment of the cutting blade relative to the workpiece so that a particular depth of cut within a range of depths can be selected.

Figure 2:
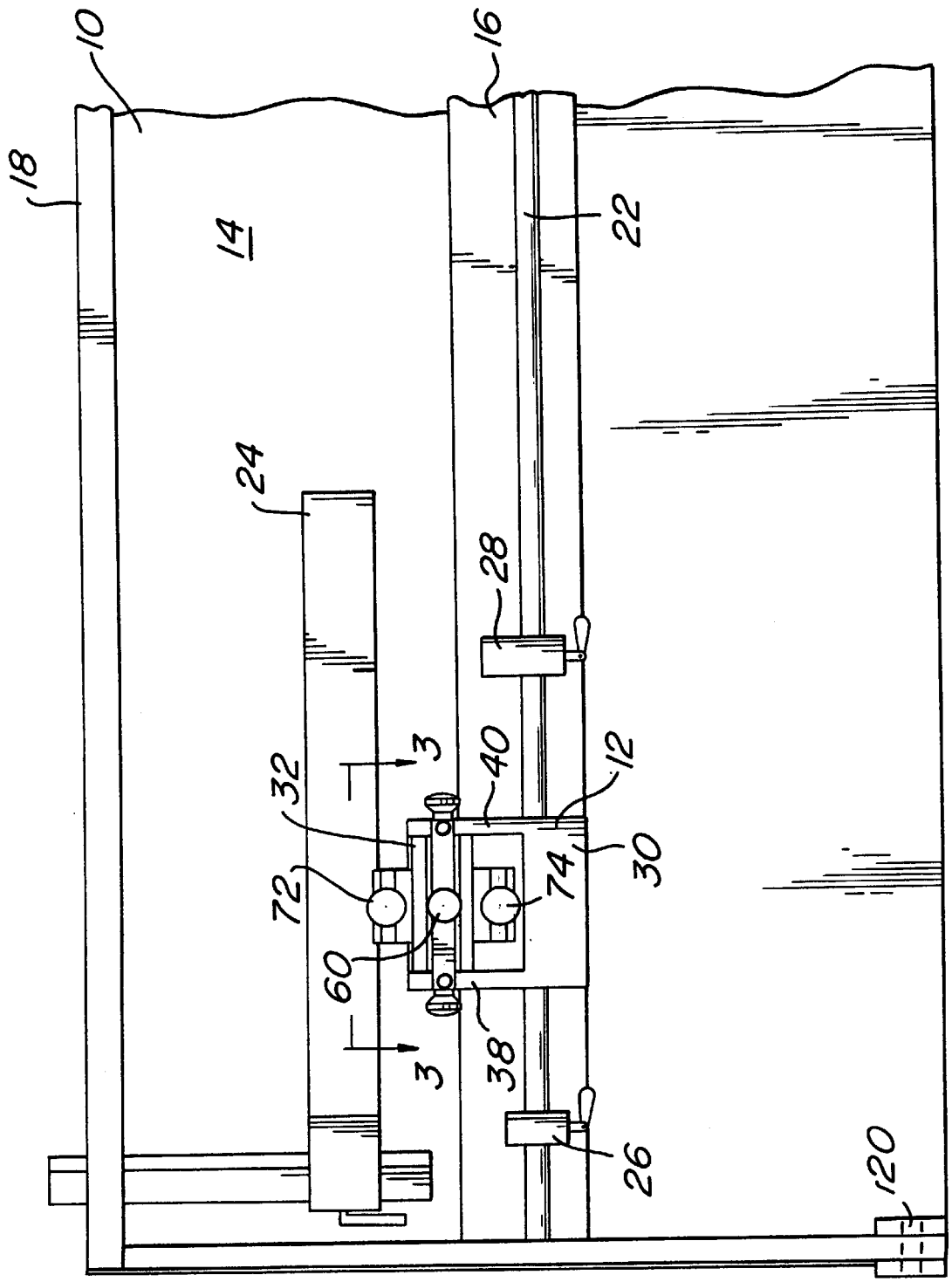
FIG. 2 is a partial plan view of the cutting apparatus illustrated in FIG. 1.
Figure 4:
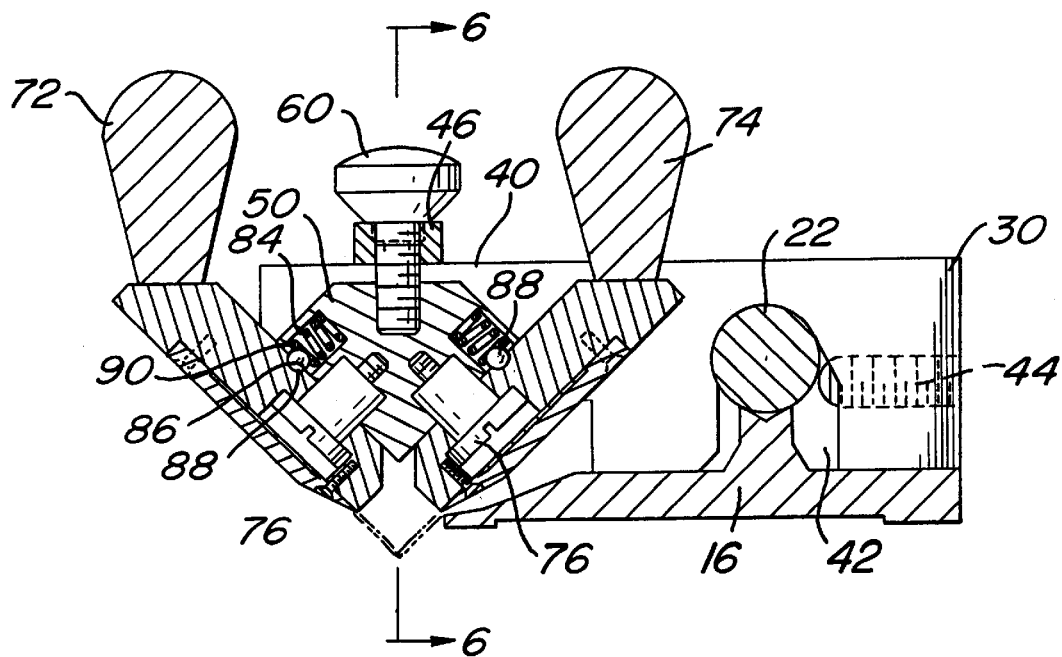
FIG. 4 is a cross-sectional view of the cutting head assembly of FIG. 3 taken along line 4—4.
Figure 5:
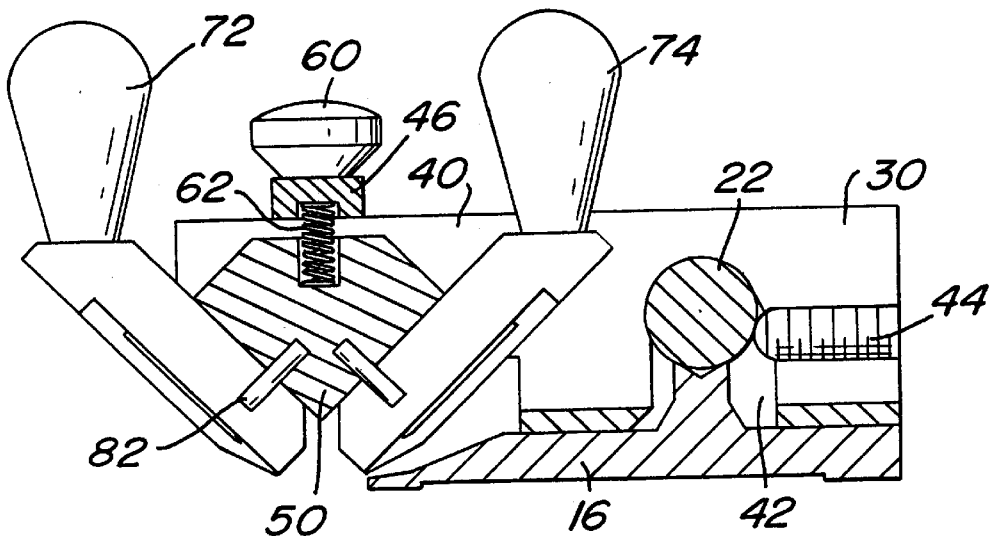
FIG. 5 is a cross-sectional view of the cutting head assembly of FIG. 3 taken along line 5—S.
Figure 6:
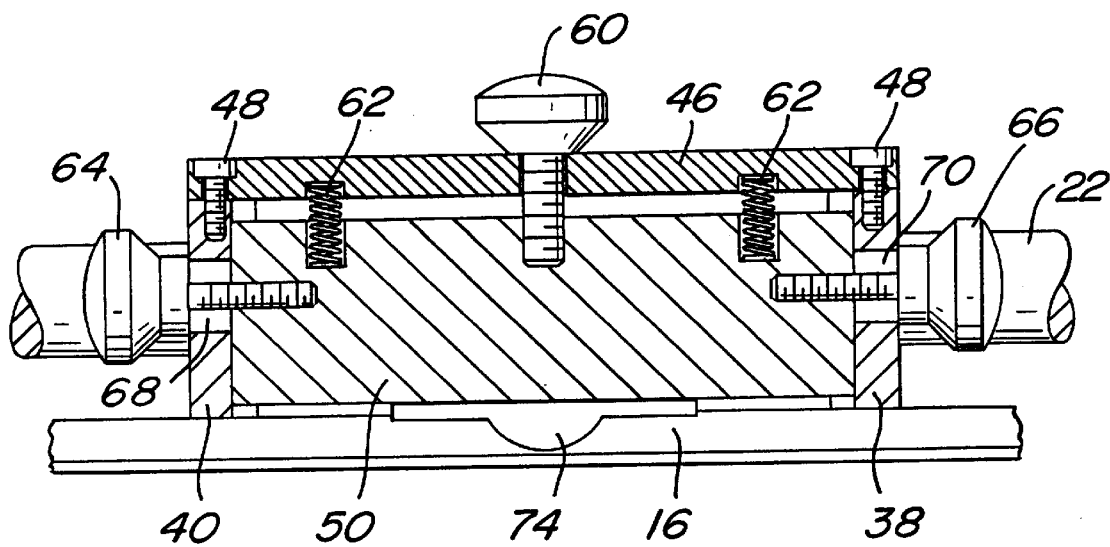
FIG. 6 is a cross-sectional view of the cutting head assembly of FIG. 4 taken along line 6—6.

As best illustrated in FIG. 2, the solid body section 30 connects to the shaft 22 and has a pair of outwardly-extending, spaced-apart arms, 38 and 40, to which any one of the blade holding units can be connected at a time. As illustrated in FIGS. 4 and 5, the body section 30 has a recess 42 formed therein to receive the shaft 22 and has a pair of fastener 44 which enable the cutting head assembly 12 to be connected to or removed from the shaft 22. Thus, the cutting head assembly 12 can be completely removed from the apparatus 10 and connected to another hand-operated cutting apparatus (not shown) having a different sized base board. As an example, commonly used base board sizes typically include forty-eight and sixty inch lengths.

The blade holding unit 32, illustrated in FIGS. 1–7, has a tension bar 46 which secures the blade holding unit 32 to the solid body section 30 of the cutting head assembly 12 in a manner which permits ready installation and removal. As illustrated, when installed, the tension bar 46 is positioned atop the arms, 38 and 40, such that the tension bar 46 extends substantially perpendicular to and spans the distance between the arms, 38 and 40. A pair of fasteners 48, one per arm, are utilized to secure the tension bar 46 to the arms, 38 and 40. After the tension bar 46 is connected to the arms, 38 and 40, the tension bar remains stationary relative to the solid body section 30 of the cutting head assembly 12.

Another component of the blade holding unit 32 is a solid elongate member 50 which rides on the body section 30 between the arms, 38 and 40. The exact position of the elongate member 50 relative to the body section 30 is adjustable in a vertical direction so that the depth of cut provided by the cutting head assembly 12 can be adjusted within a range of depths. To this end, the elongate member 50 is provided with a pair of oppositely-located, outwardly-extending, vertically-disposed tongues, 52 and 54, which are received in mating engagement in a pair of opposed, vertically-disposed grooves, 56 and 58, in the arms, 38 and 40. Thus, the vertical-disposed tongue and groove engagement of the elongate member 50 and the arms, 38 and 40, permit only vertical movement therebetween.

The desired height of the elongate member 50 relative to the body section 30 is selected by rotating a threaded depth adjustment knob 60 which projects out of the elongate member 50 and through an aperture in the tension bar 46. The elongate member 50 is retained under resilient tension to the tension bar 46 by a pair of springs 62 located therebetween and by the depth adjustment knob 60 which can be rotated to close or widen the spacing between the elongate member 50 and the tension bar 46. After the elongate member 50 is positioned at the desired height, a pair of treaded depth locking fasteners, 64 and 66, are tightened to secure the elongate member 50 to the arms, 38 and 40, at the selected position. The depth locking fasteners, 64 and 66, extend laterally from opposite sides of the elongate member 50 through elongate, slot-type apertures, 68 and 70, in the arms, 38 and 40. Thus, a desired depth of cut within a range of depths is readily set by first loosening, or completely removing, the depth locking fasteners, 68 and 70, followed by rotating the depth adjustment knob 60, and then by tightening the depth locking fasteners, 68 and 70.

Figure 3:
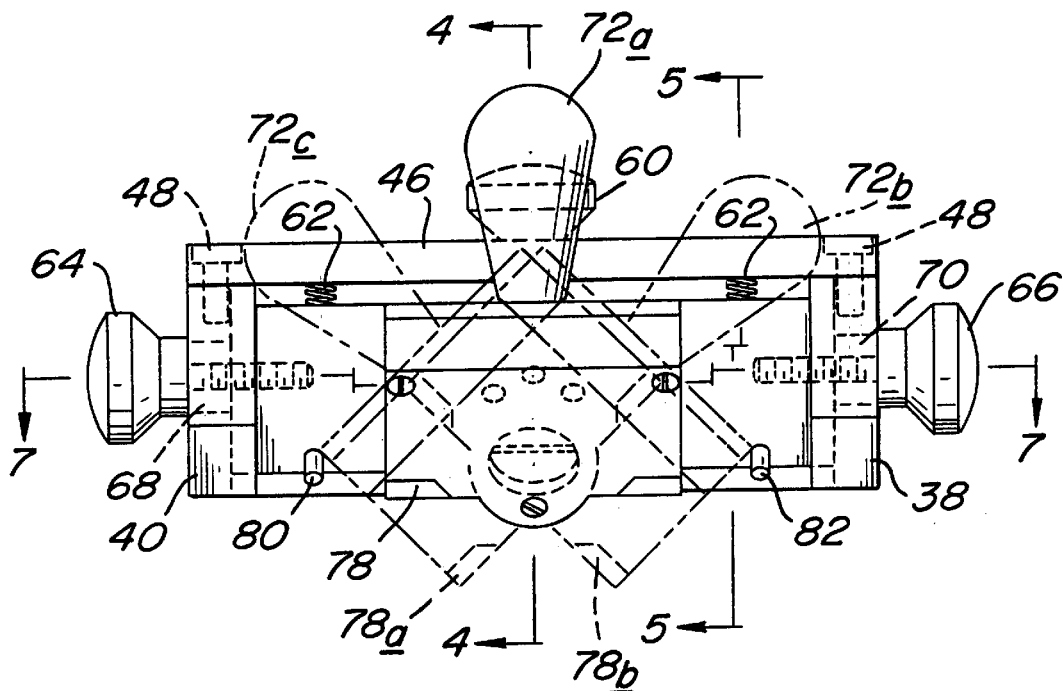
FIG. 3 is an elevational view of the cutting head assembly of the cutting apparatus illustrated in FIG. 1.

A pair of pivoting blade carriers, 72 and 74, are mounted on the elongate member 50 of the blade holding unit 32. Each blade carrier, 72 and 74, is connected to the elongate member 50 by a shoulder bolt 76 which creates a pivot point between the blade carriers, 72 and 74, and the elongate member 50 such that each blade carrier can pivot in both clockwise and counterclockwise directions about the pivot point. As best illustrated in FIG. 3, the blade carrier 72 is shown in a normal, centered non-cutting position 72a and is shown in phantom lines pivoted in both clockwise and counter-clockwise cutting positions, 72b and 72c, respectively.

Preferably, stops are provided on the elongate member 50 to limit the pivoting movement of each blade carrier and to maintain the blade carrier in the center, or neutral, non-cutting position when the blade carrier is not engaged by the user. To this end, a pair of outwardly extending stops, 80 and 82, limit the pivoting movement of the blade carrier 72 to 45° relative to the centered position. A neutral position stop 84 is provided by a ball 86 which is captured between the elongate member 50 and the blade carrier 72 and which is urged into a detent 88 in the blade carrier 72 by a spring 90.

Each blade carrier, 72 and 74, has a razor blade 78 for cutting the workpiece. As illustrated in FIG. 3, one of the corner portions, 78a and 78b, of the blade 78 is placed in a position to cut the workpiece when the blade carrier 72 is pivoted 45° from the center position 72a into one of the cutting positions, 72b or 72c. Thus, when a blade carrier is pivoted into a cutting position and the cutting head assembly 12 is caused to travel on the shaft 22, the workpiece is cut by the blade.

Figure 10:
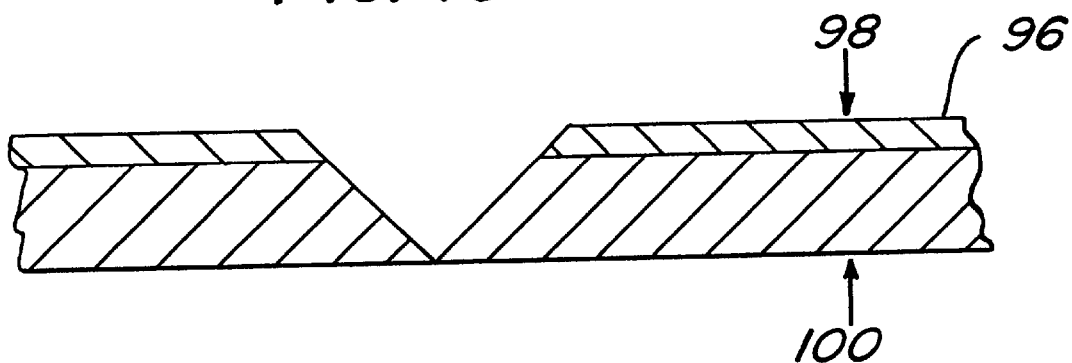
FIG. 10 is a cross-sectional view of a sheet of mat board having a V-groove cut therein.
Figure 11:
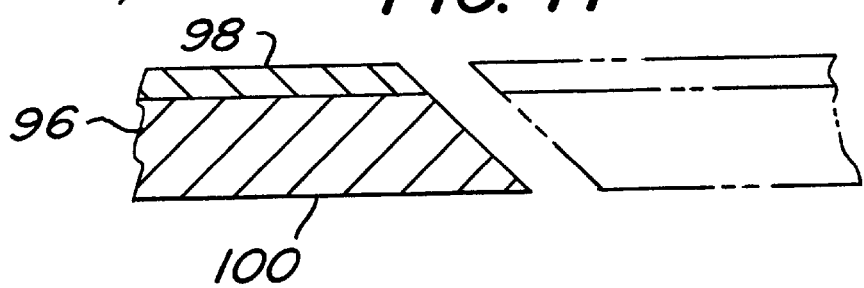
FIG. 11 is a cross-sectional view of a sheet of mat board which has been severed and which has a beveled edge.
Figure 12:
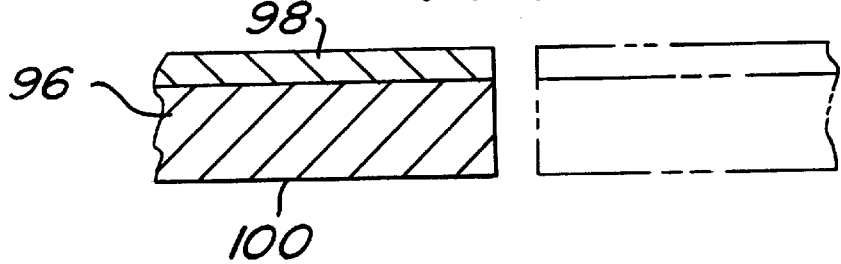
FIG. 12 is a cross-sectional view of a sheet of mat board which has been severed and has a straight edge.

As best illustrated in FIG. 4, the blade holding unit 32 is provided with a pair of blade carriers, 72 and 74, each having blades extending at a 45° angle relative to the workpiece. Thus, either one of the blade carriers, 72 or 74, could be utilized to make a 45° beveled cut in a workpiece as illustrated in FIG. 11, or both blade carriers, 72 and 74, could be sequentially utilized to make a V-groove cut as illustrated in FIG. 10 provided the depth of the cut is appropriately selected. Alternatively, the cutting head assembly 12 could be provided with only a single blade carrier 92 as provided on the blade holding unit 34 illustrated in FIG. 8. Yet in another alternative blade holding unit 36, illustrated in FIG. 9, a single blade carrier 94 is provided which can effect straight edge cuts as illustrated in FIG. 12. Other non-illustrated blade holding units could be provided which provide bevel cuts at various angles relative to the workpiece or which have circular rotating blades capable of cutting glass, plexiglass or like sheet-like framing material.

One of the unique features of the cutting apparatus 10 of the present invention is that mat board can be placed on the cutting apparatus 10 with its front face facing upward. For example, FIGS. 10–12 illustrate a sheet of mat board 96 with a front textured face 98 and a rear face 100, the front face 98 being the part of the mat board which is viewed when utilized in a picture frame. By selecting the appropriate blade holding unit, a desired cut can be made directly into the front face 98. For instance, the V-groove cut of FIG. 10 is made directly into the front face 98 and does not require any flipping or taping of the mat board 96.

DETAILED DESCRIPTION OF THE PREFERRED METHOD

Referring to the cutting apparatus 10 discussed in detail above, a method of cutting a workpiece can be accomplished in a novel and improved manner.

The workpiece, such as a piece of mat board 96, is placed on the base board 14 and aligned adjacent the squaring guide 24. As stated previously, the mat board 96 is placed with its front face 98 facing upward and its rear face 100 confronting the base board 14. The squaring guide 24 is adjusted to set the location of the cut relative to an edge of the mat board 96, and the clamping bar assembly 16 is closed to clamp the mat board 96 to the cutting apparatus 10. In addition, the stops, 26 and 28, for the cutting head assembly 12 are adjusted to define the length of travel of the cutting head assembly 12 on the shaft 22 of the clamping bar assembly 16.

One of a plurality of blade holding units, 32, 34 or 36, is selected depending on the desired type of cut and is mounted on the cutting head assembly 12. To this end, the depth locking fasteners, 64 and 66, are completely removed from the elongate member 50 and the tongues, 52 and 54, of the elongate member 50 are slid into the upwardly open vertical grooves, 56 and 58, in the arms, 38 and 40, of the body section 30 of the cutting head assembly 12 until the tension bar 46 abuts the arms, 38 and 40. The tension bar 46 is affixed to the arms, 38 and 40, with fasteners 48 and the vertical position of the elongate member 50 is fine tuned by rotating the depth adjustment knob 60. After the elongate member 50 is vertically positioned to provide the desired depth of cut, the depth locking fasteners, 64 and 66, are tightened.

Cutting is initiated by pivoting one of the blade carriers, 72, 74, 92 or 94, 45° from its neutral position and by causing the cutting head assembly 12 to travel along the shaft 22 between the set cutting head assembly stops, 26 and 28. Preferably, the blade carrier is pivoted in one direction to cut at least a portion of the workpiece and then the blade is pivoted in the opposite direction to cut at least the remaining portion of the workpiece. This ensures that the end of each cut in the mat board includes a 45° bevel so that cuts made in perpendicular directions meet and form neat corners.

When a different type of cut is desired, the blade holding unit currently on the cutting head assembly 12 is removed and replaced with the appropriate alternate blade holding unit.

Thus, the above-described hand-operated cutting apparatus and its method of use according to the present invention provide a ready means of making various types of cuts in various types of sheet-like material used in framing pictures and the like. The novel interchangeability and adjustability of the components of the cutting head assembly accomplish these stated goals.

While a preferred hand-operated cutting apparatus and a method of cutting sheet-like picture framing material have been described in detail, various modifications, alterations, and changes may be made without departing from the spirit and scope of the cutting apparatus and method according to the present invention as defined in the appended claims.

What is claimed is:

1. In a hand-operated apparatus for cutting a mat board workpiece, comprising a base board for supporting the workpiece, a clamping bar assembly extending across and pivotally mounted to said base board for clamping the workpiece to said base board, and a cutting head assembly mounted on said clamping bar assembly for lengthwise slidable movement thereon, the improvement wherein said cutting head assembly comprises:

a body section engaging said clamping bar assembly and having a pair of spaced-apart, outwardly extending arms; and a plurality of interchangeable blade holding units each carrying at least one blade, each of said blade holding units being capable of being removably mounted, one at a time, to and between said arms in a manner which permits ready adjustment of a depth of the cut of the blade relative to the workpiece;

each of said plurality of interchangeable blade holding units including a tension bar which is removably securable to said arms and which, when secured to said arms, remains stationary thereto; and said plurality of interchangeable blade holding units including a first blade holding unit which when mounted to said arms has at least one blade extending at an angle relative to the base board for use in making bevel cuts in the workpiece and a second blade being unit which when mounted to said arms has at least one blade mounted vertically relative to the base board for use in making straight edge cuts in the workpiece.

2. Apparatus according to claim 1, wherein said body section of said cutting head assembly is removably engaged to said clamping bar assembly so that said cutting head assembly is capable of being readily removed from the cutting apparatus and connected to another cutting apparatus having a different sized base board.

3. Apparatus according to claim 1, wherein said first blade holding unit has a pair of blades mounted at an angle relative to the base board for use in making a V-groove cut in the workpiece.

4. Apparatus according to claim 3, wherein each of said plurality of interchangeable blade holding units further includes an elongate member extending underneath said tension bar and between said arms, said elongate member being capable of simultaneously engaging each of said arms and being capable of vertical movement relative to the workpiece, said arms and said tension bar.

5. Apparatus according to claim 4, wherein said arms have opposed vertically disposed grooves cut therein, and wherein each elongate member has a pair of oppositely located laterally extending vertical tongues which are cooperatively received within said grooves in said arms and which are captured therein by said tension bar.

6. Apparatus according to claim 5, wherein said arms have opposed elongate apertures, and wherein each elongate member has a pair of laterally extending depth locking fasteners which extend through said elongate apertures and are capable of locking said elongate member to said arms at a predetermined vertical location along said elongate apertures to set said depth of cut.

7. Apparatus according to claim 6, wherein each of said plurality of interchangeable blade holding units has a fine tuning depth adjustment knob which is threadably received by said elongate member and projects through said tension bar, and wherein each of said plurality of interchangeable blade holding units has a pair of springs located between said tension bar and said elongate member.

8. Apparatus according to claim 7, wherein each of said plurality of interchangeable blade holding units includes at least one blade carrier which mounts said blade to said elongate member and which is pivotally connected to said elongate member.

9. Apparatus according to claim 8, wherein said blade carrier of each of said plurality of interchangeable blade holding units has a normal centered non-cutting position and is capable of pivoting about 45° in each direction from said normal centered non-cutting position into a cutting position.

10. Apparatus according to claim 9, wherein each elongate member has a pair of outwardly extending stops to limit said blade carrier from pivoting greater than about 45° in each direction from said normal centered non-cutting position.

11. Apparatus according to claim 9, wherein a normal centered non-cutting position stop is provided on each of said plurality of interchangeable blade holding units between said elongate member and said blade carrier.

12. Apparatus according to claim 11, wherein each of said normal centered non-cutting position stops is provided by a detent formed in a face of said blade carrier which confronts a ball bearing captured between said blade carrier and said elongate member and urged outwardly from said elongate member by a spring.

* * * * *